Patented Oct. 5, 1926.

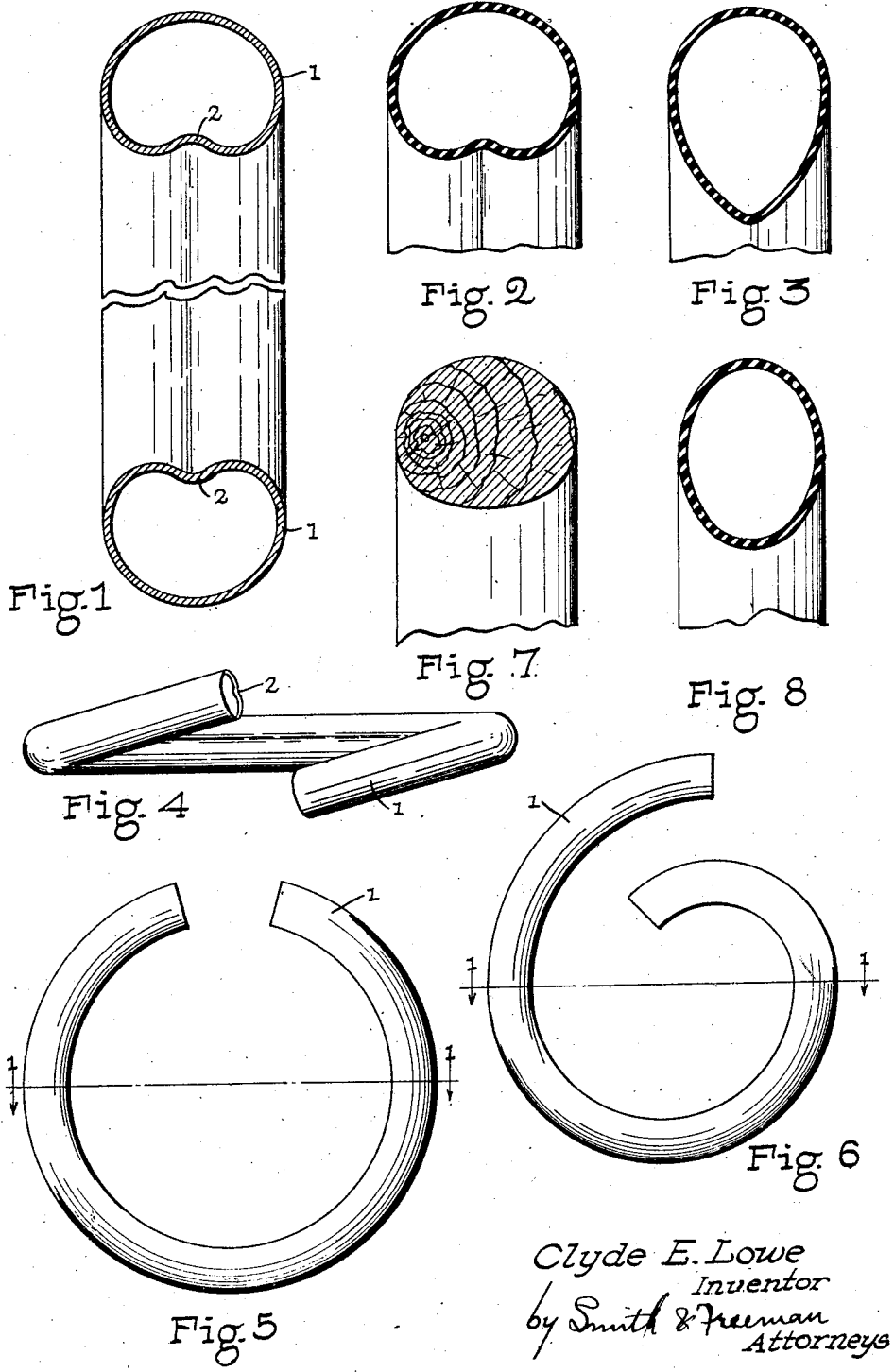

1,601,759

UNITED STATES PATENT OFFICE.

CLYDE E. LOWE, OF EAST CLEVELAND, OHIO.

MANDREL FOR TIRE TUBES.

Application filed October 21, 1924. Serial No. 744,942.

This invention relates to the manufacture of inner tubes for pneumatic tires and has for its object the provision of a new and improved mandrel and process which shall produce an improved conformation of tube. In the early days of the tire industry it was customary to form inner tubes upon straight bars of wood or tubes of metal, and after curing to circle the same and cement the ends together. While the external circumference of the torus thus produced was greater than the internal circumference, still the diameter of the tube was so small compared with the diameter of the wheel that the inequality was well within the ability of the rubber to accommodate; but with the present day tendency in shapes and configurations of tires it becomes desirable not only to fashion the tube originally in strongly arcuate or approximately circular forms but also to afford the same an ovate cross section in order to conform as closely as possible to the internal shape of the tire and rim. Attempts have been made to effect this result by the use of mandrels of ovate cross section; but the external surface of the tube is always rough and unsightly after curing, wherefore it is usual to turn the tube inside out disclosing to view the smooth surface produced by contact with the mandrel. Experience, however, proves that this reversal of a tube cured on an ovate mandrel results in the production of an article of nondescript shape. The object of the present invention is the provision of a mandrel of such a shape that the tube produced thereon, when turned inside out, shall exhibit a smooth and pleasing exterior combined with the ovate cross section desired.
In the drawings accompanying and forming a part of this application I have shown certain physical forms in which my inventive idea can be embodied. Fig. 1 is a cross sectional view through a mandrel embodying my improvements and corresponding to the line 1—1 of Figs. 5 or 6; Fig. 2 is a sectional view of a part of an inner tube cured thereon prior to being turned inside out; Fig. 3 is a similar cross sectional view of the same tube after being turned inside out; Fig. 4 is an edge view of one type of mandrel embodying my improvement; Figs. 5 and 6 are plan views of other shapes of mandrel embodying my improvements; Fig. 7 is a cross sectional view through a modified shape of mandrel also embodying my invention; and Fig. 8 is a sectional view of a tube cured thereon.

My improved mandrel comprises an arcuate member 1, having a circumferential dimple 2 in its inner wall. The mandrel may be made of wood or metal as desired. I prefer metal as being cheaper to make and easier to handle. It may be made either solid or hollow although I prefer to make it hollow for purposes of lightness and small heat capacity. In addition the width of the body is preferably somewhat greater in a lateral direction than it is in a radial direction; for example referring to Fig. 1 and having in mind the Ford balloon size, a very satisfactory shape is that wherein the horizontal dimension is four inches and the maximum vertical dimension is three inches, the dimple 2 being $\frac{3}{16}$ of an inch deep. The preferred cross section of the tube can also be described as being approximately that of an apple, maliform, although the reentrant dimple can be omitted in some cases as shown in Fig. 7 in cases where a less pronounced ovate shape of the tube is acceptable.

So long as the mandrel has the external cross section described and is markedly arcuate from end to end its particular conformation is not important to the present invention. Thus it can be made in strictly circular form as shown in Fig. 4, with its two ends spaced apart sufficiently to enable the application or withdrawal of the rubber; or it can be made in the form of a helical segment as shown in Fig. 5 or a spiral segment as shown in Fig. 6 in order to facilitate the application and removal of the rubber. In any case the shape of the rubber tube cured thereon is shown in Fig. 2 prior to reversal and in Fig. 3 after such reversal. Such a tube is completed merely by measuring to the proper length and cementing or vulcanizing the two ends together.

The mandrel has its lateral sides of greater curvature than its inner and outer sides. The curvature of the inner side may be considered as decreased toward zero in Fig. 7 and as decreased beyond zero in Fig. 1. In either case a tube cured thereon tends to conform thereto until reversed, whereupon the reversal of the more sharply curved side walls tends to make them flat while the strain thus imposed upon the less sharply curved inner and outer walls serves to make them bulge. The use of the dimple 2 accentuates the curvature at the interior of the tube making it ovate while the use of a smooth oval as in Fig. 7 produces a uniformly oval tube as in Fig. 8.

When these mandrels are made of metal I preferably form them by drawing in dies as illustrated in my former application filed August 21, 1922, Serial No. 583,341, although it can be made on a boring mill by cutting process in the case of cast metal or by spinning processes in the case of wrought metal. Accordingly I do not limit myself in any way except as specifically recited in my several claims.

Having thus described my invention what I claim is:

1. A mandrel for tire tubes consisting of an arcuate member having its cross section everywhere convex excepting at the interior of the arc where it exhibits a concavity.

2. A mandrel for tire tubes consisting of an arcuate member comprising at least the greater part of a complete circle and having a generally oval cross section, the maximum diameter of its cross section being that which is parallel to the axis of the arc and the least dimension of its cross section being that which is radial to the axis of the arc.

3. A mandrel for tire tubes consisting of an arcuate member of approximately maliform cross section the reentrant portion running circumferentially about the interior of the arc.

4. The process of producing a circular hollow rubber tube having flattened sides which consists in molding the rubber on a mandrel to a cross section exhibiting flattened inner and outer faces and lateral faces of comparatively increased curvature, curing the rubber, and afterward turning it inside out.

5. The process of producing a tire tube of ovate cross section which contains the steps of curing the tube on a mandrel to a substantially circular shape and cross section exhibiting a corrugation or dimple in one side, and afterward turning the tube inside out.

6. The process of making a smooth surfaced annular rubber tube of oval cross section wherein the major axis of the oval lies in the plane of the torus, which contains the steps of curing the rubber on a mandrel to a substantial circular shape and maliform cross section, turning the cured tube inside out, and securing its ends together.

In testimony whereof, I hereunto affix my signature.

CLYDE E. LOWE.